United States Patent
Schneider

(12) 
(10) Patent No.: US 6,324,064 B1
(45) Date of Patent: Nov. 27, 2001

(54) INTERFACE DEVICE FOR CHIP CARDS

(75) Inventor: Robert Schneider, Martinsried (DE)

(73) Assignee: SCM Microsystems GmbH, Pfaffenhofen (DE)

(*) Notice: Subject to any disclaimer, the term of this patent is extended or adjusted under 35 U.S.C. 154(b) by 0 days.

(21) Appl. No.: 09/403,020

(22) PCT Filed: Jul. 9, 1998

(86) PCT No.: PCT/EP98/02068

§ 371 Date: Oct. 18, 1999

§ 102(e) Date: Oct. 18, 1999

(87) PCT Pub. No.: WO98/48368

PCT Pub. Date: Oct. 29, 1998

(30) Foreign Application Priority Data

Apr. 18, 1997 (DE) ............................................. 197 16 423
Apr. 21, 1997 (DE) ............................................. 197 16 694

(51) Int. Cl.[7] ....................................................... H05K 1/14
(52) U.S. Cl. ........................ 361/737; 361/752; 361/796
(58) Field of Search ................................. 361/737, 752, 361/683–686, 724–727, 796, 797; 439/946, 76.1; 257/679, 380; 235/492, 441

(56) References Cited

U.S. PATENT DOCUMENTS

| 5,375,037 | 12/1994 | Le Roux | 361/737 |
| 6,069,795 | * 5/2000 | Klatt et al. | 361/737 |
| 6,097,605 | * 8/2000 | Klatt et al. | 361/737 |

FOREIGN PATENT DOCUMENTS

| 43 10517 C2 | 10/1994 | (DE) . |
| 195 29 949 A1 | 3/1996 | (DE) . |
| 296 07 253 U1 | 8/1996 | (DE) . |
| 0 552 078 A1 | 1/1993 | (EP) . |
| 0 532 166 A | 3/1993 | (EP) . |
| 0 704 813 A | 4/1996 | (EP) . |
| 03 141486 | 6/1991 | (JP) . |

* cited by examiner

Primary Examiner—Jeffrey Gaffin
Assistant Examiner—Phuong T. Vu
(74) Attorney, Agent, or Firm—Nixon Peabody LLP; Stuart J. Friedman

(57) ABSTRACT

An interface device for chip cards in standardized credit card format has a flat housing in likewise standardized PCMCIA format and is intended for insertion into a corresponding accommodation slot (30). The housing has a plug-in socket (12) at its front end and, extending from its rear end, an accommodation channel (32) for a chip card (18). The breadth of the housing in its edge region (A) adjoining the plug-in socket (12) is the same as that of the standardized chip card format. In order to avoid that any parts project outwardly from the accommodation slot (30) and yet to ensure a lateral guidance of the chip card (18), the housing, in its condition fully inserted in the accommodation slot (30), does not or not essentially protrude therefrom. The accommodation channel (32) terminates before the edge region (A) of the housing adjoining the plug-in socket (12). Furthermore, the housing is closed on the sides at least at its rear end (B) and has a breadth there which only slightly exceeds that of the chip card format. The width of the accommodation channel (32) at the rear end (B) of the housing is about the same as the breadth of the chip card format.

30 Claims, 4 Drawing Sheets

INTERFACE DEVICE FOR CHIP CARDS

The invention relates to an interface device for chip cards in standardized credit card format.

DE 43 10 517 C2 already discloses an interface device for chip cards which has a flat housing in the standardized PCMCIA format. This housing is inserted into a corresponding accommodation slot of a computer and has at its front end a plug-in socket which corresponds to a multiple contact row at the bottom of the accommodation slot in the computer. Extending from its rear end there is provided an accommodation channel for a chip card.

EP 0 704 813 A2 shows an interface device for chip cards of the same type, which is employed in particular in the case of portable computers.

The breadth of a conventional housing for PCMCIA apparatus is 54 mm and is exactly the same as the standardized breadth of a chip card in the credit card format. The accommodation channel for the chip card accordingly extends over the entire breadth of the housing of the interface device so that this housing is open on the two narrow sides. In order to still ensure a lateral guidance for the chip card, the housing is provided at its rear end with a widened collar which projects out of the accommodation slot of the computer and also forms a lateral rim of the insertion slot for the chip card. This collar is considered to be indispensable to the lateral guidance of the chip card because the breadth of the chip card is identical with that of the housing of a PCMCIA device.

The invention now provides an interface device for chip cards which enables a lateral guidance for the chip card even without a collar protruding from the accommodation slot. In the interface device according to the invention, the breadth of the housing in its edge region adjoining the plug-in socket is the same as that of the standardized chip card format. The accommodation channel for the chip card terminates already before the edge region of the housing adjoining the plug-in socket. At least at its rear end the housing is closed on the sides and has a breadth there which exceeds that of the chip card format by up to 0.5 mm. That portion of the housing of the interface device which is inserted in the accommodation slot also comprises at least the major portion of the rear end closed on the sides. The width of the accommodation channel at the rear end of the housing is about the same as the breadth of the chip card format. The invention is based on the idea that the standard breadth of the PCMCIA housing needs to be given only in the vicinity of the plug-in socket while the accommodation slot has an increased width in the region of its insertion opening to provide on the one hand for a facilitated insertion of the PCMCIA housing and on the other hand to allow the attachment of spring contacts which are fitted on the narrow sides of the accommodation slot and intended to come into contact with the metallic housing of the PCMCIA apparatus so as to establish a ground connection between the computer and the housing. Although the width of the accommodation slot in this region only slightly exceeds the breadth of the standardized credit card format, this difference is sufficient to accommodate thin side walls of the housing which are able to provide for perfect lateral guidance of a chip card. The side walls of the housing may have a thickness of up to 0.25 mm in this area, i.e. a thickness which is not less than in conventional housing designs of PCMCIA apparatus, so that the side walls may be formed integrally with the main surfaces. It is thus not necessary for separate lateral wall parts to be attached to the narrow sides of the housing, so that an additional layer of material is avoided, which could result in a local increase in the wall thickness.

It would be desirable to close the accommodation channel for the chip card on the sides over its entire length so as to firstly prevent any foreign bodies from penetrating and secondly to avoid any edges or steps on the side faces which might get interlocked with the spring contacts. It is however not possible to extend the side walls provided in accordance with the invention at the rear end of the housing as far as up to the region of the plug-in socket because the accommodation slot is not sufficiently wide in that region.

The measure of the invention according to which the accommodation channel terminates already before the edge region of the housing adjoining the plug-in socket makes it possible however to close the lateral intermediate region of the housing by thin edge strips the wall thickness of which may amount to about half the wall thickness of the side walls in the region of the rear end of the housing, that is, about 0.1 to 0.15 mm. Since the edge strips, owing to the reduced depth of the accommodation slot, need not be extended as far as up to the plug-in socket, the accommodation channel has a width sufficient to accommodate the edge strips in the region of their front ends.

The side walls or lateral edge strips of the housing are preferably attached not to the narrow sides, but rather to the main surfaces of the housing, more particularly to the lateral longitudinal edges of the main surfaces of the housing which are set off from the central region of the main surfaces by a step, thus providing sufficient room for accommodating a double thickness of material.

A special advantage of the configuration of the interface device in accordance with the invention resides in that in contrast to a housing designed to have open sides, it ensures a perfect contact at the side walls by means of the spring contacts provided in the accommodation slot. The side walls may in this way also provide for the lateral guidance of the housing in the accommodation slot.

In order to perfect the lateral guidance of the chip card at its front end in the accommodation channel so that its contact surfaces are precisely aligned with the contacts of the interface device, in the preferred embodiment the accommodation channel has rounded guide surfaces at its front end adjoining the edge region of the housing, which correspond to the rounded corners of the credit card format, or rectangular guide surfaces which have an analogous guiding function.

Further features and advantages of the invention will be apparent from the following description of a plurality of embodiments and from the drawings to which reference is made and in which.

Figure 1:
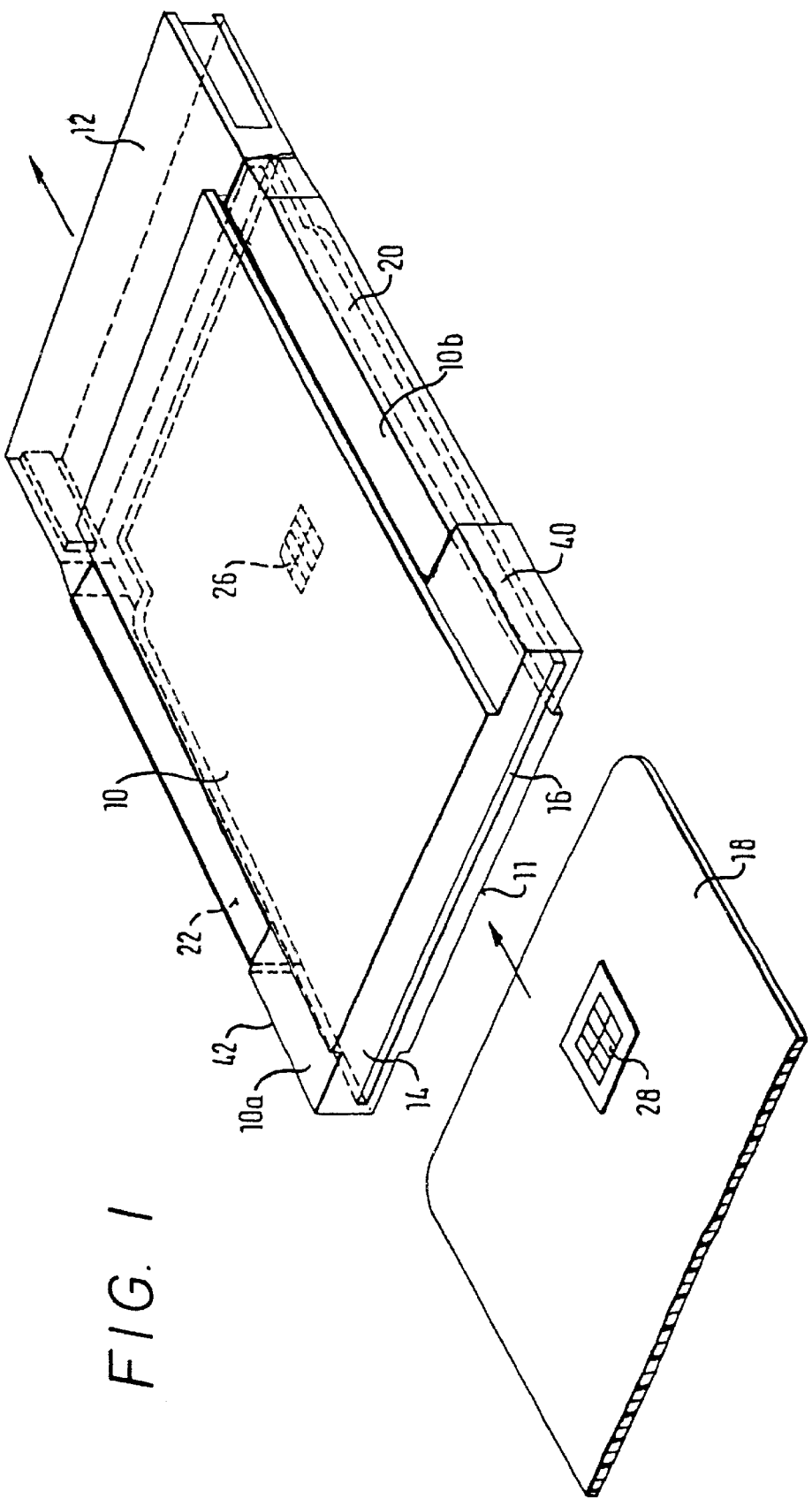
FIG. 1 shows a diagrammatic perspective view of the interface device according to the invention.

The interface device shown in FIG. 1 comprises a flat housing in the generally known, standardized PCMCIA format. This housing has an upper main surface 10 having two longitudinal edges 10a, 10b which are each set off by a step, a plug-in socket 12 at its front end, a narrow rear side 14 having an insertion slot 16 for a chip card 18, two lateral narrow sides 20, 22, and a lower main surface 11 which is symmetrical to the upper main surface 10. Inside the housing a printed circuit card 24 is arranged (FIGS. 3 and 4) which accommodates various components of the interface device, in particular numerous electronic component parts as well as a contact group 26 for contacting the contact field 28 of the chip card 18.

Figure 2:
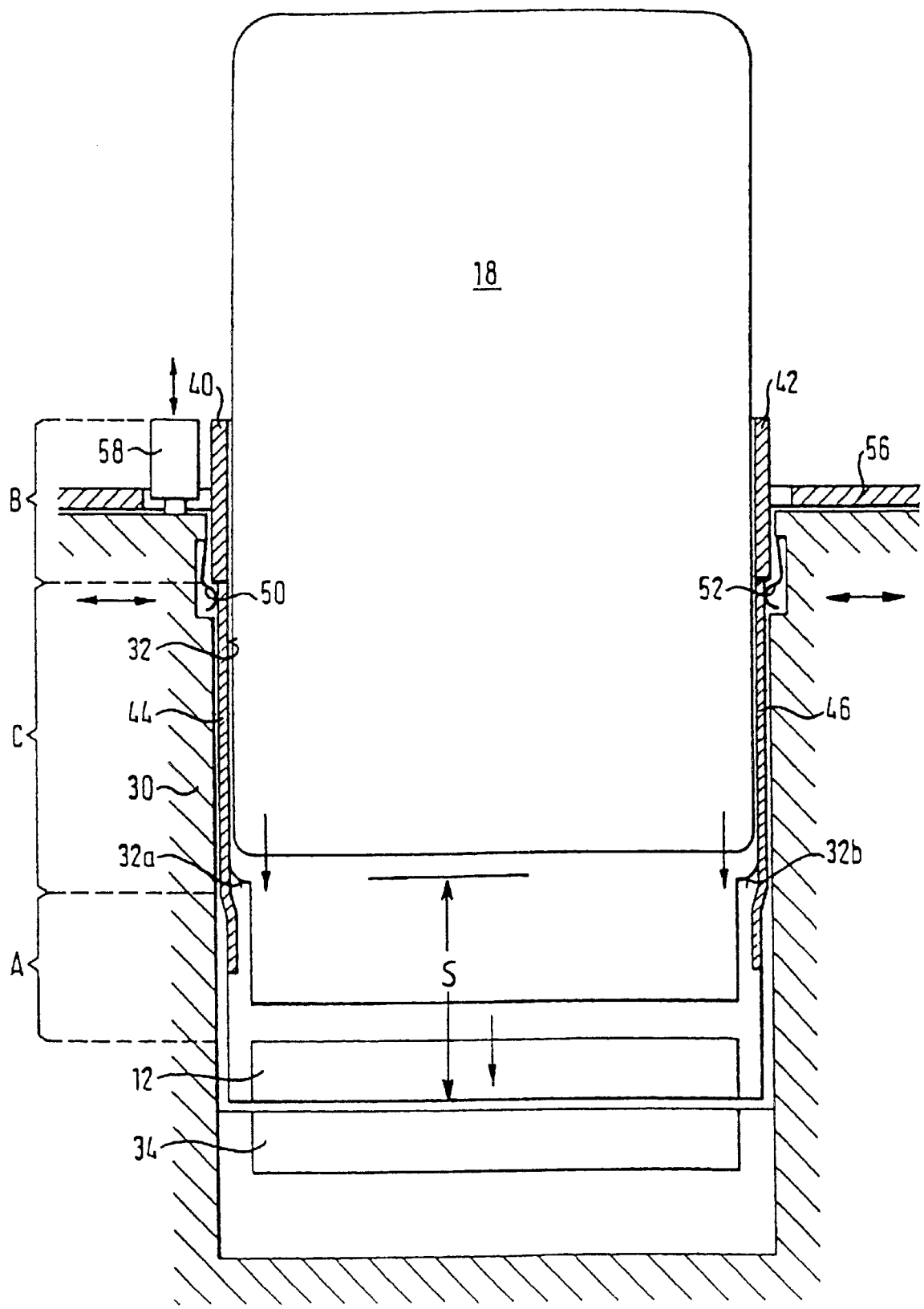
FIG. 2 shows a diagrammatic longitudinal sectional view of the device in an accommodation slot of a computer.

FIG. 2 shows an accommodation slot 30 of a computer or a module for such computer, with an interface device according to FIG. 1 being almost fully inserted in this accommodation slot. A chip card 18 is inserted in the accommodation channel 32, extending from the insertion slot 16, of the interface device. The plug-in socket 12 is designed to match a multiple contact row 34 at the bottom of the accommodation slot 30.

The accommodation channel 32 has roughly the breadth of the chip card 18 and extends as far as to an edge region A of the housing, adjoining the plug-in socket 12. The accommodation channel 32 terminates at this edge region A by two rounded guide surfaces 32a, 32b, which correspond to the rounded shape at the corners of the credit card format. As an alternative, the guide surfaces 32a, 32b may be designed to be rectangular. The accommodation channel 32 ends at a distance S from the front end of the housing or the plug-in socket 12. This distance amounts to at least about 20 mm, preferably 25 mm or more.

Figure 3A:
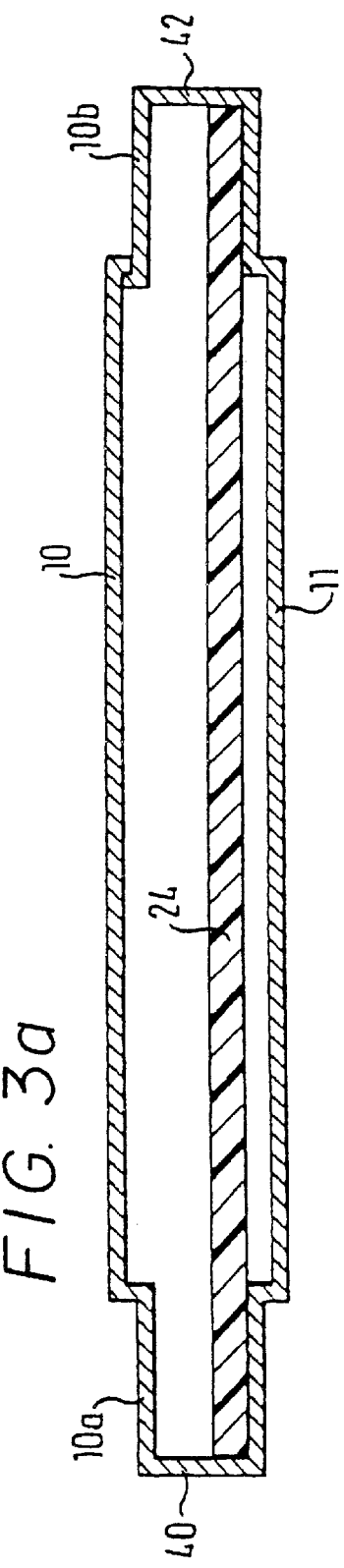
FIGS. 3a and 3b show cross-sectional views of two embodiments of the device in the region of the rear end.
Figure 3B:
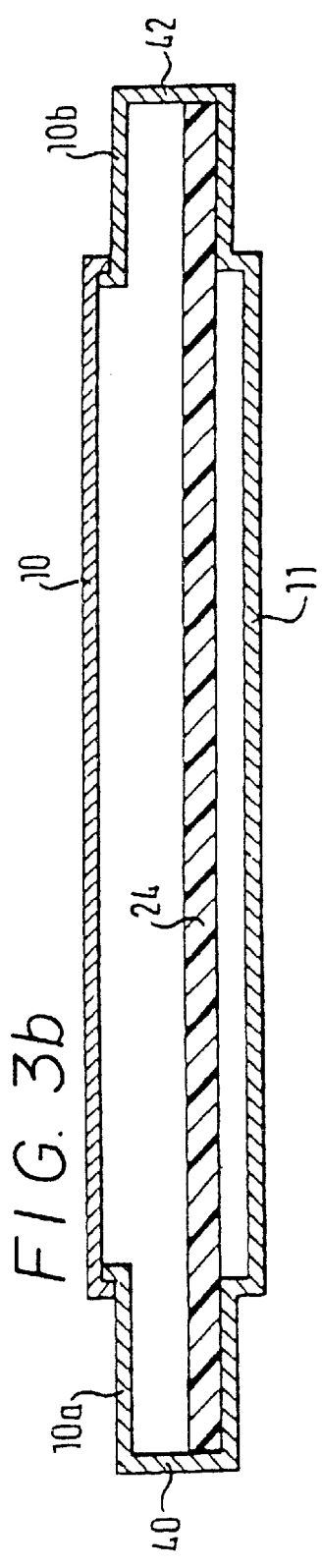
Figure 4:
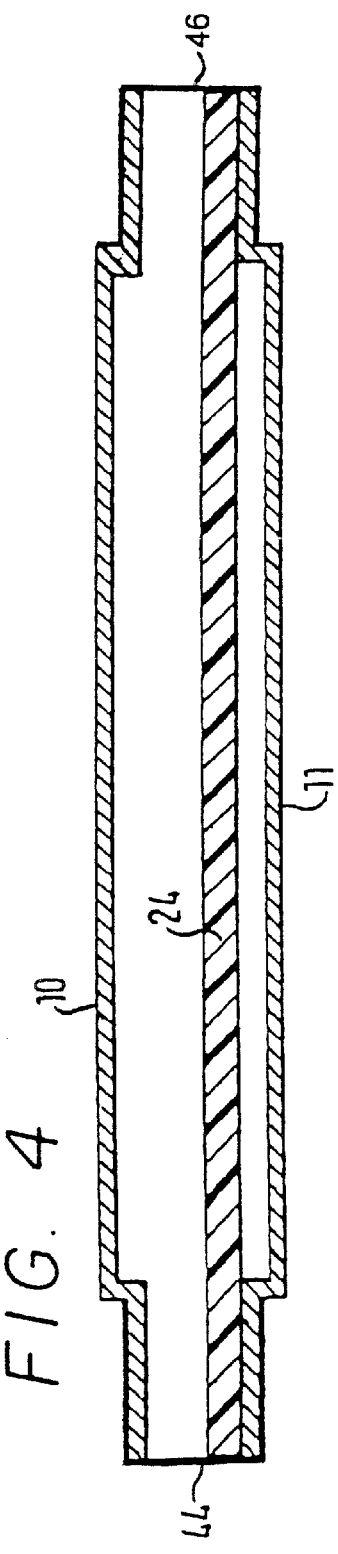
FIG. 4 shows a cross-sectional view of the device in the central region.

At the rear end of the device, which comprises the insertion slot 16 for the chip card 18, the housing is closed by side walls 40, 42 which, as illustrated in FIGS. 3a and 3b, may be formed integrally with the housing part which constitutes either of the main surfaces of the housing (FIG. 3b) or both main surfaces of the housing (FIG. 3a). These side walls 40, 42 however extend only over the rear end region of the housing referenced B in FIG. 2. They effect a lateral guidance of the chip card 18 which is completed by the guide surfaces 32a, 32b once the chip card 18 is fully inserted.

The intermediate region C of the housing between the front edge region A and the rear end region B is closed on the sides by narrow, thin-walled edge strips 44, 46. These edge strips 44, 46 are U-shaped in cross-section with two legs resting on the outside on the longitudinal edges 10a, 10b of the housing and a rib connecting them, which forms the side wall of the housing in the intermediate region C thereof. The accommodation channel 32 is thus closed on the sides over its entire length. The ends of the edge strips 44, 46 which are adjacent to the plug-in socket are fitted into the narrow sides of the edge region A in order to avoid the formation of edges or steps.

On either of the narrow sides of its outer end the accommodation slot 30 has a spring contact 50, 52 accommodated in a recess but protruding into the accommodation slot from the side. These spring contacts 50, 52 are connected to ground of the computer or computer module. When the device is fully inserted, they are in contacting engagement with the side walls 40, 42. The components of the accommodation slot 30 are covered toward the outside in the usual manner by a housing wall 56 of the computer or computer module. In addition, an ejector key 58 protruding outward is provided in the usual manner next to the accommodation slot.

As can be seen from FIG. 2, the length of the device in relation to the depth of the accommodation slot 30 is selected such that the housing of the device does not or not essentially protrude from the accommodation slot when it is fully inserted in the latter. This is very desirable because for instance in the case of a portable computer any parts projecting outward may be disturbing. The chip card 18, on the other hand, protrudes from the accommodation slot over a considerable part of its length. This, however, is not a shortcoming because the chip card is inserted only when in use. It is even made easier to handle it when a relatively large surface area is available for touching and holding it.

In the region which corresponds to the edge region A of the device, the accommodation slot 30 has a width which is the same as the breadth of the chip card 18. The width of the accommodation slot 30 at its outer end is somewhat larger, thus permitting the accommodation of the side walls 40, 42 which protrude beyond the breadth of the chip card 18. More particularly, the wall thickness of the side walls 40, 42 may be about 0.2 to 0.25 mm. This wall thickness is sufficient also for the main surfaces of the housing so that a one-part or a two-part housing design is feasible, as is shown in FIGS. 3a and 3b.

The edge strips 44, 46 in the intermediate region C are, however, provided as separate parts because they need to be fabricated of a thinner material the wall thickness of which amounts to only about 0.1 to 0.15 mm, but they may be made of sheet metal just like the other components of the housing. All housing connections are formed on the main surfaces of the housing. On the narrow sides there are no junction points which could result in a local increase in the wall thickness.

The embodiment of the interface device as described is intended for only one chip card. But the same principle may be employed to realize an interface device which is intended for two or more chip cards. One such embodiment is depicted in FIG. 5.

Figure 5:
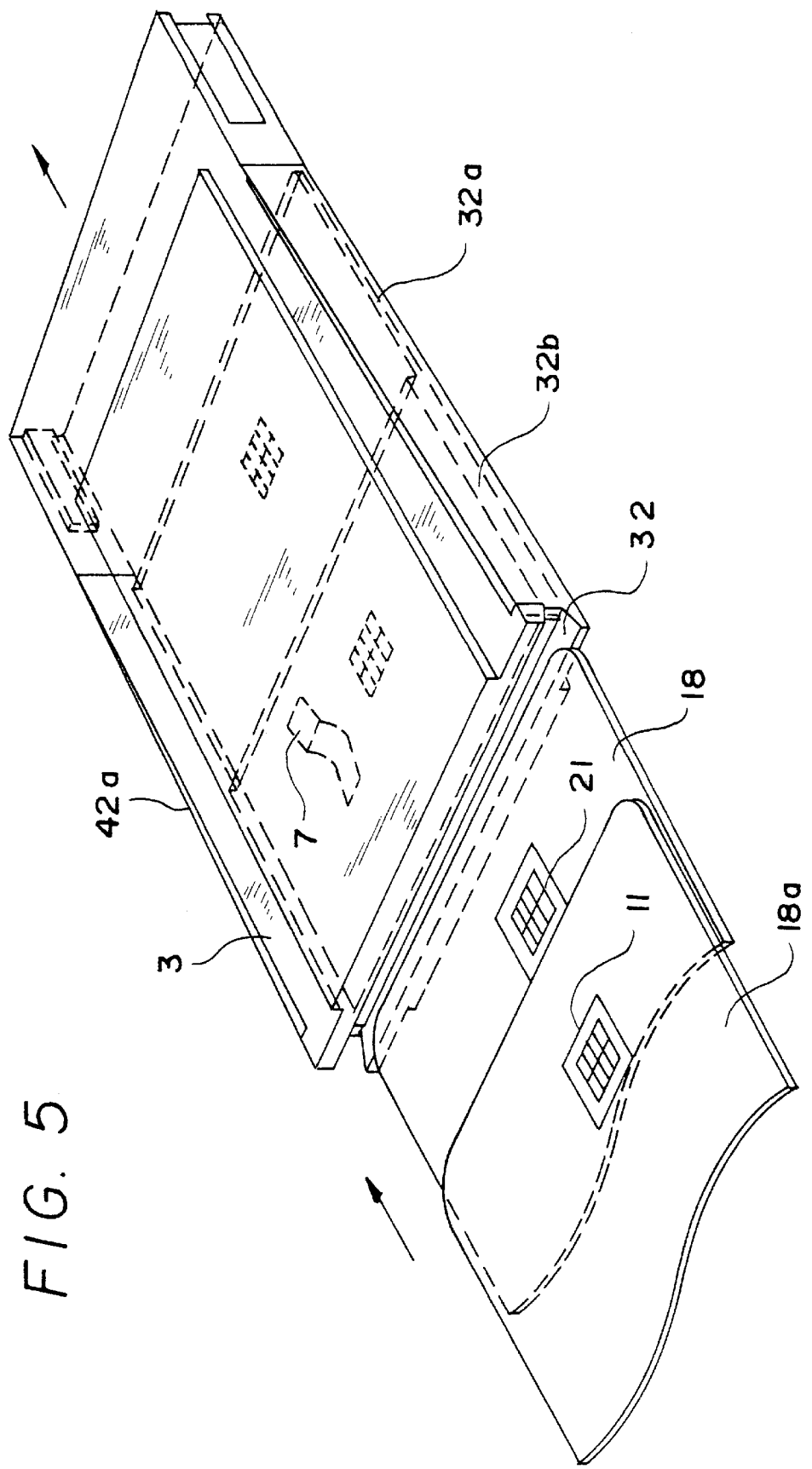
FIG. 5 shows a modified embodiment of the device.

As can be seen in FIG. 5, the accommodation channel 32 has a height which is designed for accommodating two chip cards 18, 18a lying directly one on top of the other. The accommodation channel 32 has a first part 32a of a length which is greater than that of its second part 32b so that the chip cards 18, 18a are inserted to different depths. In particular, the chip card 18a is inserted only so far that it will not cover up the contact field 21 of the chip card 18. A plate spring 7 secured under the upper main surface presses a singly inserted chip card downward into the part 32a of the accommodation channel to ensure a unique allocation.

What is claimed is:

1. A chip card interface device comprising a housing
said housing being of a generally flat shape according to the PCMCIA Standard;
said housing having a front end, a rear end and a pair of narrow side edges extending between said front and rear ends;
said housing having a plug-in socket at the front end;
said housing defining an accommodation channel;
said accommodation channel being dimensioned for a chip card in a standard credit card format;
said accommodation channel extending between said side edges from said rear end in a direction towards said front end;
said accommodation channel extending to a bottom end spaced from said front end of the housing by a distance of at least 20 mm;
said accommodation channel being closed along said side edges;
said housing having a first value of width defined by the spacing between said side edges in a first housing area extending between said front end of said housing and said bottom end of said accommodation channel;
said housing having a second value of width defined by the spacing between said side edges in second housing area extending from said bottom end of said accommodation channel in a direction towards said rear end;
and said second width value exceeding said first width value by about 0.2 to 0.3 mm.

2. The device according to claim 1, wherein said housing has a third value of width defined by the spacing between said side edges in a third housing area extending from said rear end of said housing in a direction towards said bottom end of said accommodation channel, said third width value exceeding said first width value by 0.4 to 0.5 mm.

3. The device according to claim 1, wherein said accommodation channel at said bottom end has rounded guide surfaces corresponding in shape to the corners of said chip card in said standard credit card format.

4. The device according to claim 1, wherein said accommodation channel is dimensioned for a plurality of chip cards lying directly one on top of the other.

5. The device according to claim 4, wherein said chip cards are provided with contact surfaces, said chip cards being insertable to different depths into said accommodations channel for not covering said contact surfaces of said chip cards.

6. A chip car interface device comprising a housing:
said housing being a generally flat shape according to the PCMCIA Standard;
said housing having a front end, a rear end and a pair of narrow side edges extending between said front end and rear ends;
said housing having a plug-in socket at the front end;
said housing defining an accommodation channel;
said accommodation channel being dimensioned for a chip card;
said chip card having a width corresponding to a standard credit card format;
said accommodation channel extending between said side edges from said rear end to a bottom end between said front end and said rear end;
said housing having a pair of said walls extending from said rear end in a direction of said front end and closing said accommodation channel along said side edges;
said housing having a first value of width defined by the spacing between said side edges in a first housing area extending from said rear end in the direction to said front end;
said housing having a second value of width defined by the spacing between said side edges in a second housing area extending between said front end of said housing and said bottom end of said accommodation channel;
said housing having a third housing area extending between said first housing area and said second housing area;
said second width value of said second housing area corresponding to said width of said chip card;
said first width value exceeding said second width value by up to 0.5 mm;
said side walls having a first value of thickness in said first housing area and a second value of thickness in said third housing area;
and said first value of thickness exceeding said second value of thickness.

7. The device according to claim 6, wherein said housing has a third value of width defined by the spacing between said side edges in said third housing area, said third width value exceeding said second width value by 0.2 to 0.3 mm.

8. The device according to claim 6, wherein said accommodation channel extends to a bottom end spaced from said front end of said housing by a distance of at least 20 mm, preferably 25 mm.

9. The device according to claim 6, wherein said side walls extend from said rear end of said housing to an opposite end being located in said second housing area, said side walls in said second housing area fitting into said side edges of said housing.

10. The device according to claim 6, wherein said accommodation channel at said bottom end has rounded guide surfaces corresponding in shape to the corners of said chip card in said standard credit card format.

11. The device according to claim 6, wherein said accommodation channel is dimensioned for a plurality of chip cards lying directly one on top of the other.

12. The device according to claim 11, wherein said chip cards are provided with contact surfaces, said chip cards being insertable to different depths into said accommodation channel for not covering said contact surfaces of said chip cards.

13. The device according to claim 6, wherein said side walls have outer surfaces being contacted by resilient ground contacts.

14. A chip card interface device comprising a housing;
said housing being of a generally flat shape according to the PCMCIA Standard;
said housing having a front end, a rear end, a pair of narrow side edges extending between said front and rear ends, a first main surface and a second main surface, said and second main surfaces lying opposite to each other and extending between said side edges and from said rear end to said front end;
each of said main surfaces having a pair of rim areas extending between said front and rear ends of said housing;
said housing having a plug-in socket at the front end;
said housing defining an accommodation channel;
said accommodation channel being dimensioned for a chip card;
said chip card having a width corresponding to a standard credit card format;
said accommodation channel extending between said side edges from said rear end to a bottom end between said front end and said rear end;
said housing having a pair of side walls extending from said rear end in a direction towards said front end and closing said accommodation channel along said side edges;
said housing having a first value of width defined by the spacing between said side edges in a first housing area extending from said rear end in a direction towards said front end;
said housing having a second value of width defined by the spacing between said side edges in a second housing area extending from said bottom end in a direction towards said front end;
said housing having a third housing area extending between said first housing area and said second housing area;
said second width value of said second housing area corresponding to said width of said chip card;
said first width value exceeding said second width value by up to 0.5 mm;
said first and second main surfaces in said third housing area being formed by sheet metal plates
said side walls in said third housing area being U-shaped in cross section having a web extending along said side edges and a pair of wings being interconnected by said web;

and said wings of said side walls reaching over said rim areas and said first and second main surfaces.

15. The device according to claim 14, wherein said first main surface in said first housing area is formed by a continuous sheet metal plate, said first main surface in said first housing area being formed integrally with one of said side walls and with one of said rim areas of said second main surface lying opposite to said first main surface.

16. The device according to claim 14, wherein said side walls have a first value of thickness in said first housing area and a second value of thickness in said third housing area, said first value of thickness exceeding said second value of thickness.

17. The device according to claim 14, wherein said side walls extend from said rear end to an opposite end being located in said second housing area, said side walls in said second housing area fitting into said side edges of said housing.

18. The device according to claim 14, wherein said accommodation channel at said bottom end has rounded guide surfaces corresponding in shape to the corners of said chip card in said standard credit card format.

19. The device according to claim 14, wherein said housing has a third value of width defined by the spacing between said side edges in said third housing area, said third width value exceeding said second width value by 0.2 to 0.3 mm.

20. The device according to claim 14, wherein said accommodation channel extends to a bottom end spaced from said front end of said housing by a distance of at least 20 mm, preferably 25 mm.

21. The device according to claim 14, wherein said accommodation channel is dimensioned for a plurality of chip cards lying directly one on top of the other.

22. The device according to claim 21, wherein said chip cards are provided with contact surfaces, said chip cards being insertable to different depths into said accommodation channel for not covering said contact surfaces of said chip cards.

23. The device according to claim 14, wherein said side walls have outer surfaces being contacted by resilient ground contacts.

24. A chip card interface device comprising a housing:
said housing being of a generally flat shape according to the PCMCIA Standard;
said housing having a front end, a rear end and a pair of narrow side edges extending between said front and rear ends;
said housing having a plug-in socket at the front end;
said housing defining an accommodation channel;
said accommodation channel being dimensioned for a chip card;
said chip card having a width corresponding to a standard credit card format;
said accommodation channel extending between said side edges from said rear end to a bottom end between said front end and said rear end;
said housing having a pair of side walls extending from said rear end in the direction to said bottom end closing said accommodation channel along said side edges;
said housing having a first value of width defined by the spacing between said side edges in a first housing area extending from said rear end in the direction to said front end;
said housing having a second value of width defined by the spacing between said side edges in a second housing area extending between said front end of said housing and said bottom end of said accommodation channel;
said housing having a third width value in said third housing area extending between said first housing area and said second housing area;
said second width value of said second housing area corresponding to said width of said credit card;
said first width value exceeding said second width value by up to 0.5 mm;
and said third width value exceeding said second width value by 0.2 to 0.3 mm.

25. The device according to claim 24, wherein said side walls extend from said rear end to an opposite end located in said second housing area; said side walls in said second housing area fitting into said side edges of said housing.

26. The device according to claim 24, wherein said accommodation channel at said bottom end has rounded guide surfaces corresponding in shape to the corners of said chip card in said standard credit card format.

27. The device according to claim 24, wherein said accommodation channel extends to a bottom end spaced from said front end of said housing by a distance of at least 20 mm, preferably 25 mm.

28. The device according to claim 24, wherein said accommodation channel is dimensioned for a plurality of chip cards lying directly one on top of the other.

29. The device according to claim 28, wherein said chip cards are provided with contact surfaces, said chip cards being insertable to different depths into said accommodation channel for not covering said contact surfaces of said chip cards.

30. The device according to claim 24, wherein said side walls having outer surfaces being contacted by resilient ground contacts.

* * * * *

UNITED STATES PATENT AND TRADEMARK OFFICE
CERTIFICATE OF CORRECTION

PATENT NO. : 6,324,064 B1
DATED : November 27, 2001
INVENTOR(S) : Robert Schneider It is certified that error appears in the above-identified patent and that said Letters Patent is hereby corrected as shown below:

<u>Title page,</u>
Item [22], the filing date should be -- April 9, 1998 --

Signed and Sealed this

Thirteenth Day of August, 2002

Attest:

Attesting Officer

JAMES E. ROGAN
*Director of the United States Patent and Trademark Office*